(12) United States Patent
Palmer

(10) Patent No.: US 10,179,316 B2
(45) Date of Patent: *Jan. 15, 2019

(54) INLET DISTRIBUTOR FOR SPHERICAL REACTOR

(71) Applicant: PHILLIPS 66 COMPANY, Houston, TX (US)

(72) Inventor: Brad P. Palmer, Fulshear, TX (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,032

(22) Filed: Dec. 3, 2015

(65) Prior Publication Data

US 2017/0157584 A1 Jun. 8, 2017

(51) Int. Cl.
*B01J 4/00* (2006.01)
*B01J 8/04* (2006.01)
*B01J 8/02* (2006.01)

(52) U.S. Cl.
CPC .............. *B01J 4/002* (2013.01); *B01J 4/005* (2013.01); *B01J 8/0242* (2013.01); *B01J 8/0278* (2013.01); *B01J 8/048* (2013.01); *B01J 8/0492* (2013.01); *B01J 2208/0092* (2013.01); *B01J 2208/00902* (2013.01); *B01J 2208/00929* (2013.01); *B01J 2208/00938* (2013.01)

(58) Field of Classification Search
CPC ...................... B01J 8/0278; B01J 4/002; B01J 2208/00893; B01J 2208/0092; B01J 2208/00929; B01J 2208/00938

USPC ........................................... 422/220; 239/499
See application file for complete search history.

(56) References Cited

U.S. PATENT DOCUMENTS

| 2,517,525 | A | * | 8/1950 | Cummings | ............ | B01J 8/0403 |
| | | | | | | 422/637 |
| 2,635,989 | A | * | 4/1953 | Bonner | ................ | B01J 8/0207 |
| | | | | | | 208/108 |
| 2,639,224 | A | * | 5/1953 | McAfee | ................ | B01J 8/0207 |
| | | | | | | 34/174 |

(Continued)

FOREIGN PATENT DOCUMENTS

WO 2009057909 5/2009

OTHER PUBLICATIONS

PCT Notification of Transmittal of the International Search Report and the Written Opinion of the International Searching Authority, or the Declaration, International Application No. PCT/US2013/028229, International Filing Date: Feb. 28, 2013, 16 pages.

(Continued)

*Primary Examiner* — Chee-Chong Lee
(74) *Attorney, Agent, or Firm* — Phillips 66 Company

(57) ABSTRACT

The invention relates to distributing reactants more evenly across the interior space of a reactor vessel utilizing a distributor at the inlet end that initially directs the flow of reactants through a series of circumferential nozzles. The nozzles are physical spaced such that the first nozzle provides the reactants into the vessel to spread radially and broadly outwardly into the vessel and each successive circumferential nozzle to deliver reactants in a less broadly distribution or dispersion where the interior space is filled with reactants without broadly diverse velocities that may create hot spots within the catalyst bed.

6 Claims, 9 Drawing Sheets

(56) References Cited

U.S. PATENT DOCUMENTS

| | | | | |
|---|---|---|---|---|
| 2,884,372 | A | * | 4/1959 | Bergstrom ............. B01J 8/0278 208/113 |
| 2,925,331 | A | * | 2/1960 | Kazmierczak ......... B01J 8/0242 208/146 |
| 3,363,843 | A | * | 1/1968 | Ballard .................. B01D 3/008 239/428.5 |
| 5,098,690 | A | * | 3/1992 | Koves .................... B01J 8/0278 239/533.1 |
| 7,055,583 | B2 | | 6/2006 | Filippi et al. |
| 7,261,751 | B2 | | 8/2007 | Dutta et al. |
| 7,727,491 | B2 | | 6/2010 | Filippi et al. |
| 2008/0093583 | A1 | | 4/2008 | Van Den Oosterkamp et al. |
| 2011/0213186 | A1 | | 9/2011 | Di Girolamo et al. |

OTHER PUBLICATIONS

Ronald G. McClung and Steve Novalany, "Choosing a Selective Hydrogenation System", Data has shown the effectiveness of palladium catalyst for the removal of diolefins and acetylenes in steam cracking as well as catalytic cracking, PTQ Q4, 2002, pp. 1-9.

Tai-Sheng Chou, "Optimised Reactor Internals for a Hydroprocessing Unit", Optimised distributor and quench box design can improve catalyst performance and unit reliability, H2 Advance, PTQ Q2, 2012, pp. 1-8.

* cited by examiner

INLET DISTRIBUTOR FOR SPHERICAL REACTOR

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates to reactor design and especially to the design of inlets to reactors.

BACKGROUND OF THE INVENTION

There are many sizes and designs for reactors for converting reactants to desirable intermediates and final products. Chemical engineers expend many hours designing reactor systems to optimize reactor production considering pressure, temperature, flow rates, catalyst cost, reaction kinetics along with balancing many other issues and concerns.

It is generally understood that a generally uniform distribution of reactants in a catalyst reactor is preferred to avoid hot spots and to avoid the underutilization of catalyst in the reactor. Many inlet designs have been created to improve the distribution of reactants within reactors such as where the reactants are vaporous and have higher velocities along the outside of a bend in the piping leading to the reactor. In a reactor arrangement that is fed by a conduit with a significant bend leading into the top or bottom of a reactor, the higher velocities tend to follow the outside of the bend and concentrate along one side of the reactor. Baffles and vanes have been used for years to create back pressure on the inlet stream and cause the reactants to distribute themselves across the reactor.

Another common technique is to provide an inert support bed with a thick layer of inert support that create tortuous paths to the catalyst and causing mixing and back pressure to create a level of balance across the body of the reactor.

What is desired is a technique for creating a balanced distribution of the reactants across a rector body without significantly enlarging the size of the reactor and without creating significant back pressure on the flow of reactants.

BRIEF SUMMARY OF THE DISCLOSURE

The invention more particularly relates to a reactor inlet distributor for delivering a feedstream of reactants into a reactor vessel. The reactor inlet distributor includes a generally cylindrical body with an inlet end and an outlet end. A first deflector ring with an integrally attached first neck attached to but spaced from the outlet end of the generally cylindrical body is attached to the generally cylindrical body by stanchions such that a circumferential nozzle is defined between the deflector ring and the outlet end of the generally cylindrical body where the neck extends from the first deflector ring away from the generally cylindrical body. The reactor inlet distributor further includes at least one additional deflector ring having an integrally attached additional neck attached to but spaced from the first neck by stanchions such that an additional circumferential nozzle is defined between the additional deflector ring and the first neck. Finally, a deflector plate is attached to the additional deflector ring by stanchions, but spaced from said additional neck to define a last circumferential nozzle.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
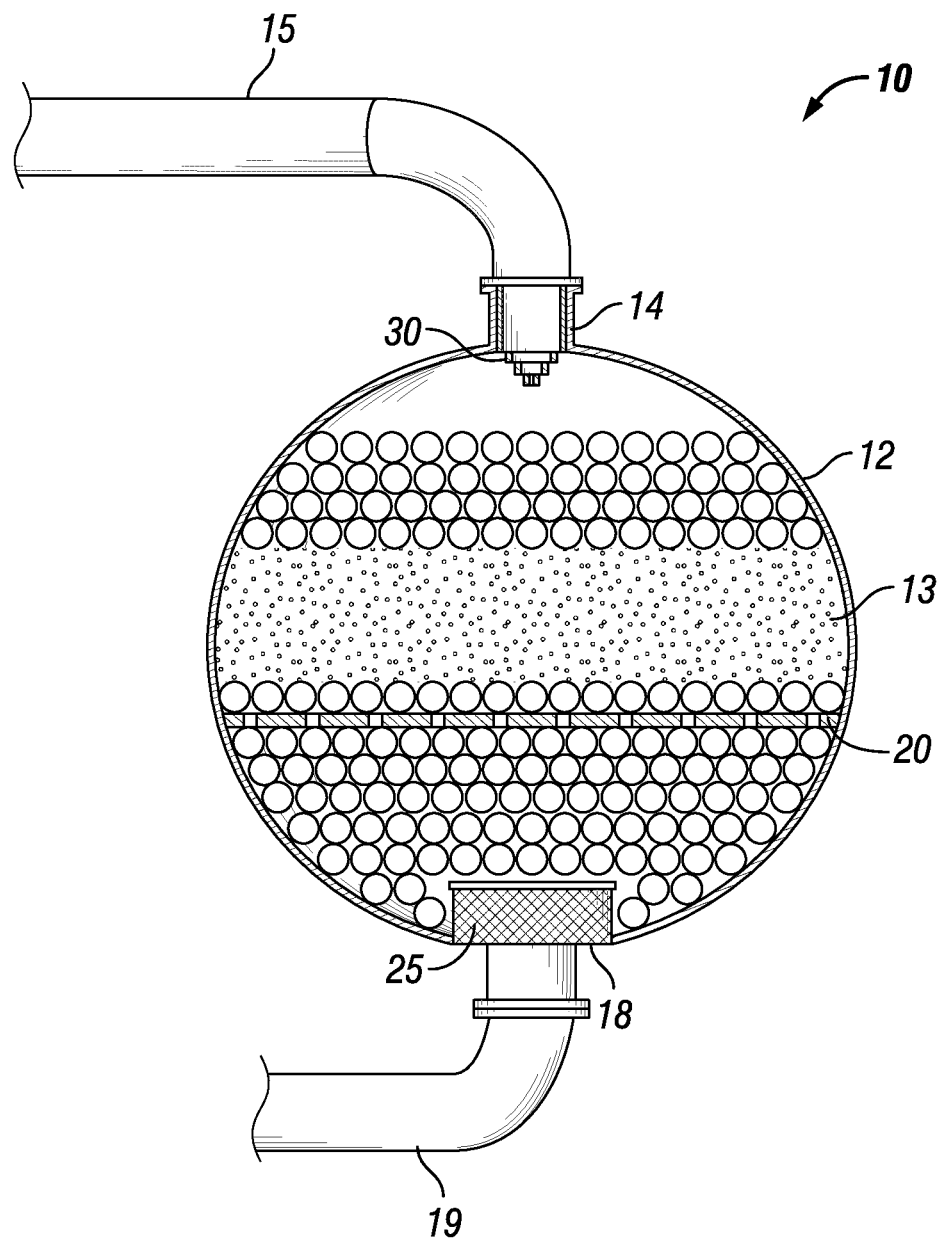
FIG. 1 is an elevation cross section of a spherical reactor showing an inventive distributor and reactor fixed valve tray.

As shown in FIG. 1, an example reactor system is shown generally indicated by the numeral 10 comprising a reactor vessel 12 that is shown having the shape of a sphere. The example reactor vessel 12 includes a catalyst bed 13 within the reactor intermediate from the inlet and outlet and having inert materials positioned above and below the catalyst bed. The example reaction vessel 12 receives reactants at the inlet end 14 from an inlet conduit 15 and delivers the reactants into the reactor vessel 12. It is noted that the illustrated reactor 12 is arranged to have the reactants flow from the top down through the catalyst to exit at the bottom while the invention may work equally well with reactors that are arranged to direct the flow from the bottom up or have a horizontal flow or have the flow in other orientations. Most reactors are top down or bottom up, but the other arrangements are possible. It should also be understood that although the reactor vessel 12 is near spherical, some reactors are also elongated with somewhat spherically shaped upper and lower portions and the present invention may be useful in all of these various reactors. Continuing with the description of the reactor system 10, the products of the reaction are conveyed to the exit end 18 at the bottom of the reactor where the products are conveyed away by an outlet conduit 19.

Figure 2:
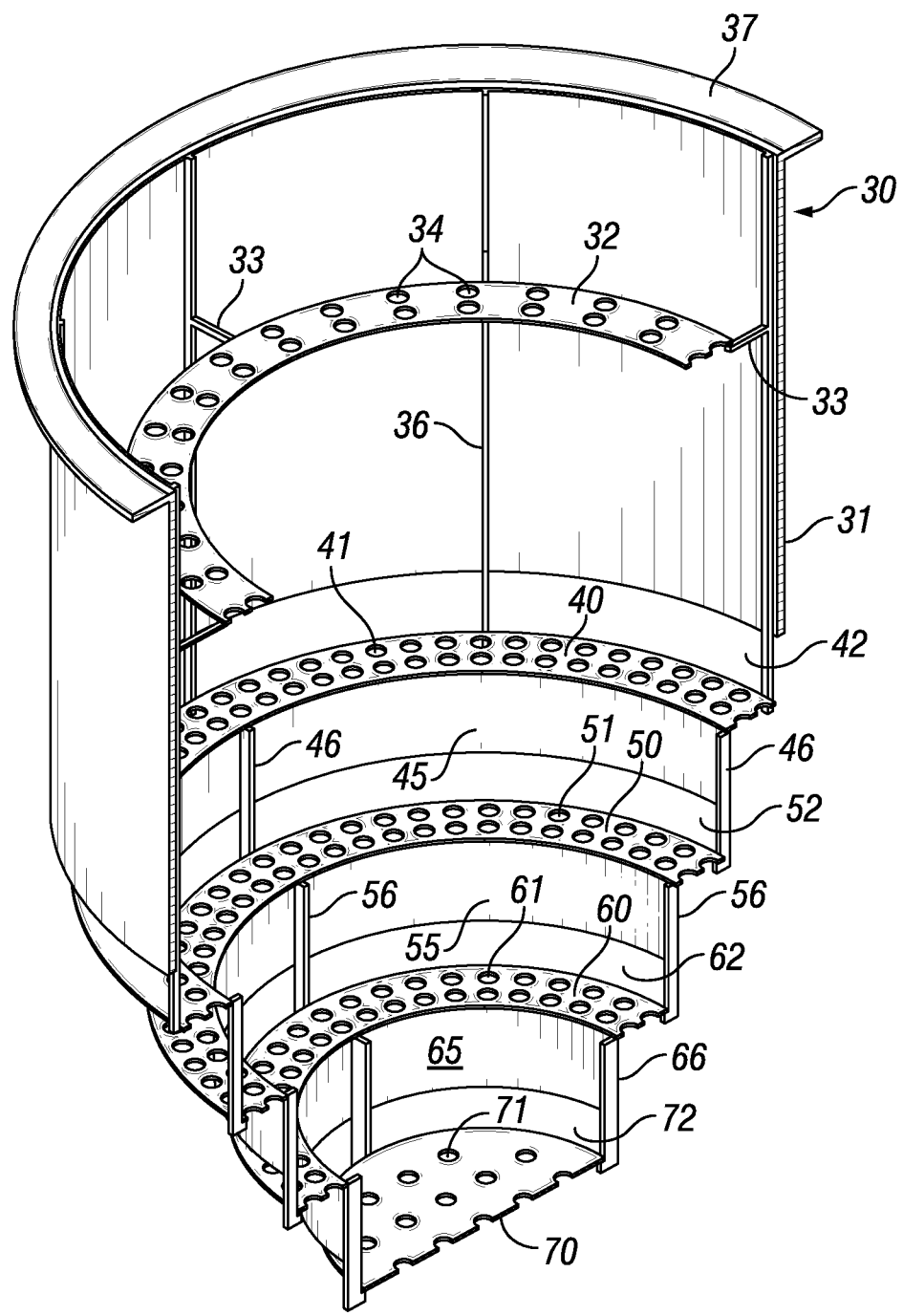
FIG. 2 is a perspective view of a cross section of the first embodiment of the inventive distributor.
Figure 3:
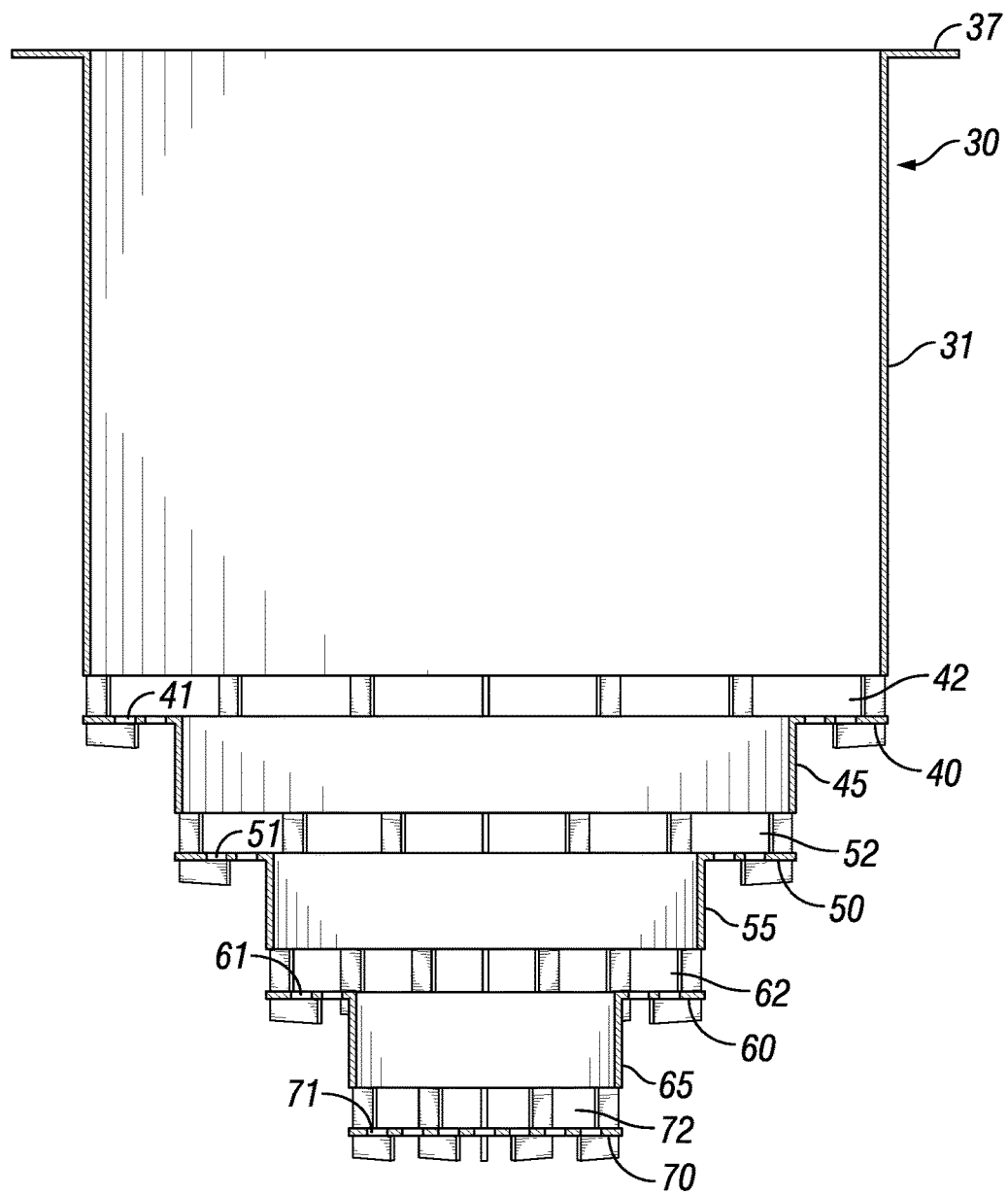
FIG. 3 is an elevation cross section of the first embodiment of the distributor.

In one aspect of the invention, a distributor 30 is positioned at the inlet end 14 of the reactor 12 to distribute the reactants flowing into the interior of the reactor vessel 12 to spread out and more evenly disperse. The distributor 30 has a configuration that imposes a very modest or low back pressure on the flow of the reactants and, at the same time, splits and directs the flows of the reactants in a manner that more evenly disperses the reactants. Turning to FIGS. 2 and 3, the distributor 30 includes a generally cylindrical shell 31 extending along the inlet conduit 15 and extending into the interior of the reactor vessel 12. The generally cylindrical shell 31 is generally about the same length as its diameter, although it is preferred that it be slightly shorter in length than its diameter.

At about a midpoint along its length (vertically) of the generally cylindrical shell 31 is an inset perforated baffle ring 32 supported by brackets 33. The inset perforated baffle ring 32 has a large, generally circular opening in the middle thereof and a generally circular outer diameter that is less than the diameter of the interior of the generally cylindrical shell 31 and spaced from the interior of the generally cylindrical shell by a generally uniform spacing around the perimeter thereof. The inset perforated baffle ring is also relatively thin compared to its diameter with holes 34. The inset perforated baffle ring is preferably constructed from flat sheet metal stock with holes punched through from top to bottom. The inset perforated baffle ring 32 is intended to obstruct between about 5% and 15% of the passage within the generally cylindrical shell 31 creating some turbulence and mixing of the reactants entering the reactor vessel 12. In particular, inset perforated baffle ring 32 provides some modest resistance to the flow of reactants into the reactor vessel 12 and divide the flow within the generally cylindrical shell 31 into two large flow paths and a plurality of smaller flow paths. The first large flow path being in the center of the inset perforated baffle ring 32 and the second large flow path being around the perimeter of the inset perforated baffle ring 32. The smaller flow paths are through the numerous holes 34.

A series of stanchions 36 are attached vertically to the interior surface of the generally cylindrical shell 31 and arranged to extend downwardly beyond the lower edge of the generally cylindrical shell 31 for supporting a first perforated deflector ring 40. The first perforated deflector ring 40 is constructed in a manner similar to the construction of the inset perforated baffle ring 32 where it is generally flat with through holes 41. The outer diameter of the first perforated deflector ring 40 is slightly less than the diameter of the generally cylindrical shell 31 and the inner diameter provides for a rather large circular opening to allow most of the reactants flowing down through the distributor 30 to continue to flow downwardly. The first perforated deflector ring reduces the area for the free flow of reactants by between 5% and 20% and more preferably between 10% and 15%. However, it should be noted that the space between the lower edge of the generally cylindrical shell 31 defines a first radial nozzle 42 that allows for reactants to exit from the distributor 30 radially outwardly. While some flow of the reactants may pass through the holes 41 in the first perforated deflector ring and thereby exit the distributor 30, the first radial nozzle 42 provides a substantial path for the reactants to enter the reactor vessel 12. As such, a first portion of the reactants are deflected radially outwardly into the upper portions of the reactor vessel 12.

A second perforated deflector ring 50 is positioned in a similar manner below the first perforated deflector ring 40. In particular, the first perforated deflector ring 40 includes a generally cylindrical first neck 45 extending down from the interior diameter of the first perforated deflector ring 40. The first neck 45 directs reactants that pass through the large circular opening further into the reactor vessel 12 and within the distributor 30 toward the second perforated deflector ring 50. Stanchions 46 are attached to the interior surface of the first neck 45 and extend downwardly beyond the lower edge of the first neck 45. As such, the second perforated deflector ring 50 is spaced from the lower edge of the first neck 45 defining a second radial nozzle 52. The outer edge of the second perforated ring 50 is slightly smaller than the inner diameter of the first neck 45.

A third perforated deflector ring 60 is positioned in a similar manner below the second perforated deflector ring 50 and continues a stair step pattern of reducing diameter generally circular central openings with successive radially oriented nozzles of reduced diameter along the periphery of the distributor 30. The second perforated deflector ring 50 includes a generally cylindrical second neck 55 extending down from the interior diameter of the second perforated deflector ring 50 in a manner similar to the first neck and the first perforated deflector ring 40. The second neck 55 conveys reactants that pass through the large central circular opening further into the reactor vessel 12 and within the distributor 30 toward the third perforated deflector ring 60. Stanchions 56 are attached to the interior surface of the second neck 55 and extend downwardly beyond the lower edge of the first neck 55. As before, the third perforated deflector ring 60 is spaced from the lower edge of the second neck 55 defining the third radial nozzle 62. Again, the outer edge of the third perforated ring 60 is slightly smaller than the inner diameter of the second neck 55.

While additional deflector rings may be incorporated into the design, two three or four are generally preferred, but ultimately, the bottom of the deflector 30 is defined by a deflector plate 70. Deflector plate 70 is mounted to the third deflector ring 60 in a manner similar to the deflector rings 40, 50 and 60. A third neck 65, having a generally cylindrical design, is attached to the inner edge of the third perforated deflector ring 60 and arranged to extend further into the reactor vessel 12. Stanchions 66 are attached to the inner surface of the third neck 65 and arranged to extend below the lower edge of the third neck 65. The deflector plate 70 being spaced below the lower edge of the third neck 65 defines the fourth generally radial nozzle 72.

Figure 4:
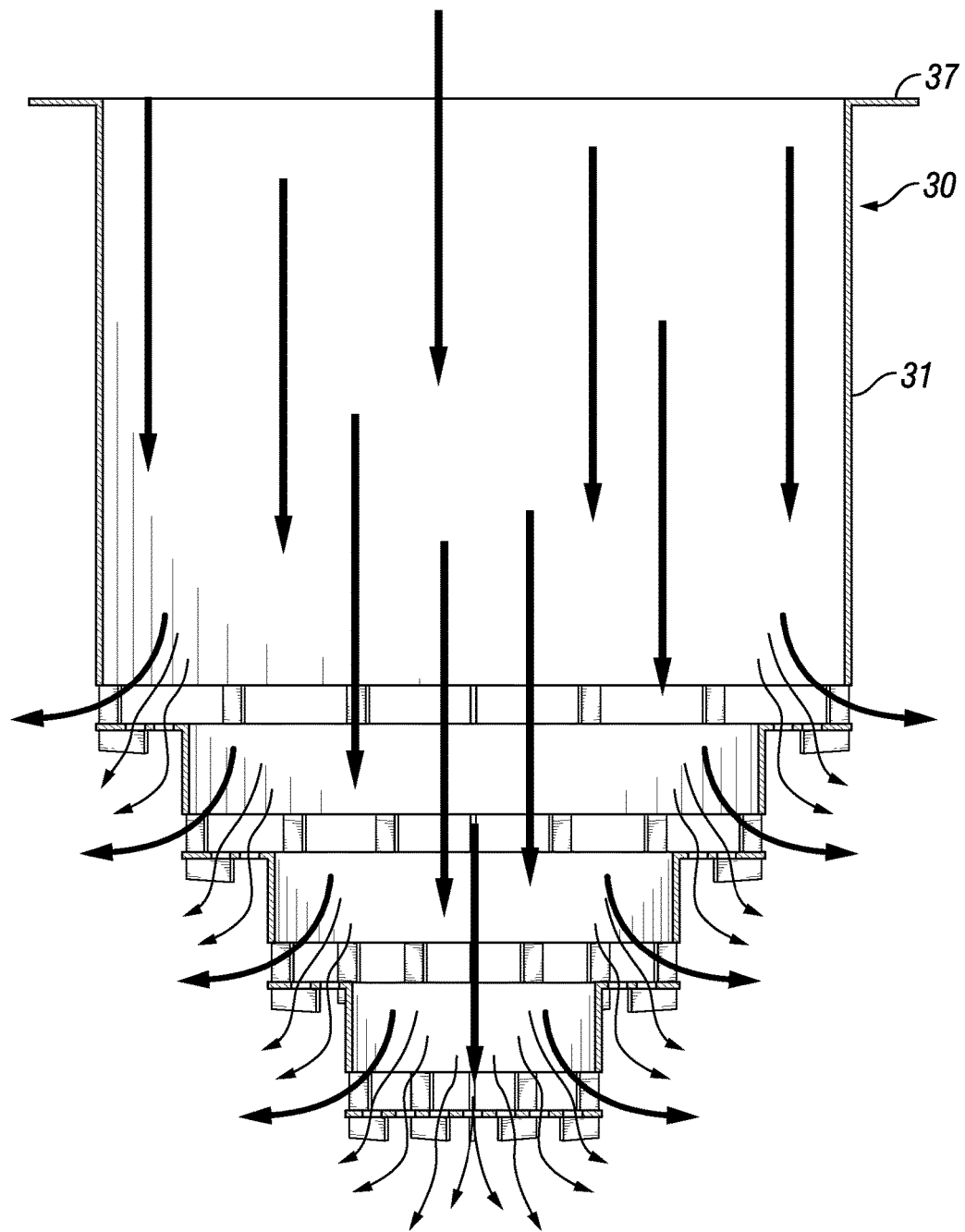
FIG. 4 is an elevation cross section of the first embodiment of the distributor showing the aerodynamics of the distributor.

The deflector plate 70, similar to the deflector rings 40, 50 and 60, has through holes 71 to allow reactants to pass down through the middle of the distributor 30 and enter into the middle of the reactor vessel 12. However, as shown in FIG. 4, the nozzles direct a significant portion of the reactants radially outward, or with a significant radially outward direction component along with some downward direction of flow with the through holes 41, 51, 61 and 71 to permit a smaller amount of flow to fill in between the primary flows through the nozzles 42, 52, 62 and 72.

There are many variations on the preferred arrangements for the distributor 30, one of which includes that the inset perforated baffle ring 32 is coaxial to the generally cylindrical shell 31 such that the vertically oriented generally cylindrical shell 31 has inset perforated baffle ring 32 generally horizontally arranged therein. Through holes 34 comprise between about 5% and 15% of the top surface of the inset perforated baffle ring 32. The distance between the inner edge of the inset perforated baffle ring 32 and its outer edge is approximately the same dimension as the space from the outer edge of the inset perforated baffle ring 32 and the interior surface of the generally cylindrical shell 31. The large generally circular opening within the inner edge of inset perforated baffle ring 32 comprises between 50% and 90% of the diameter of the interior of the generally cylindrical shell 31.

The drawings show three perforated deflector rings, however, it should be understood that the invention may comprise two deflector rings, three deflector rings, four deflector rings and even more perforated deflector rings, although between two and four are preferred.

Figure 5:
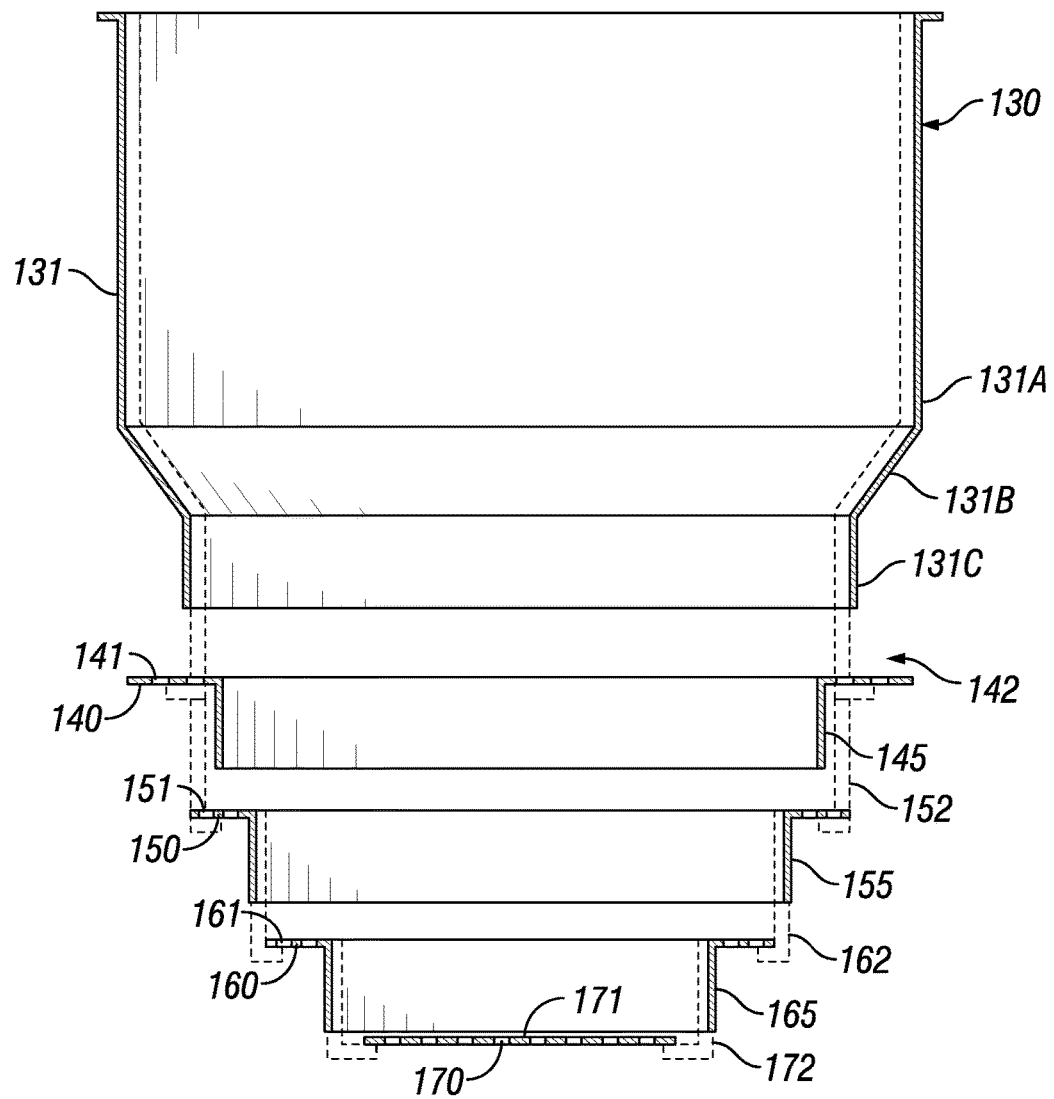
FIG. 5 is an elevation cross section of the second embodiment of the distributor.
Figure 6:
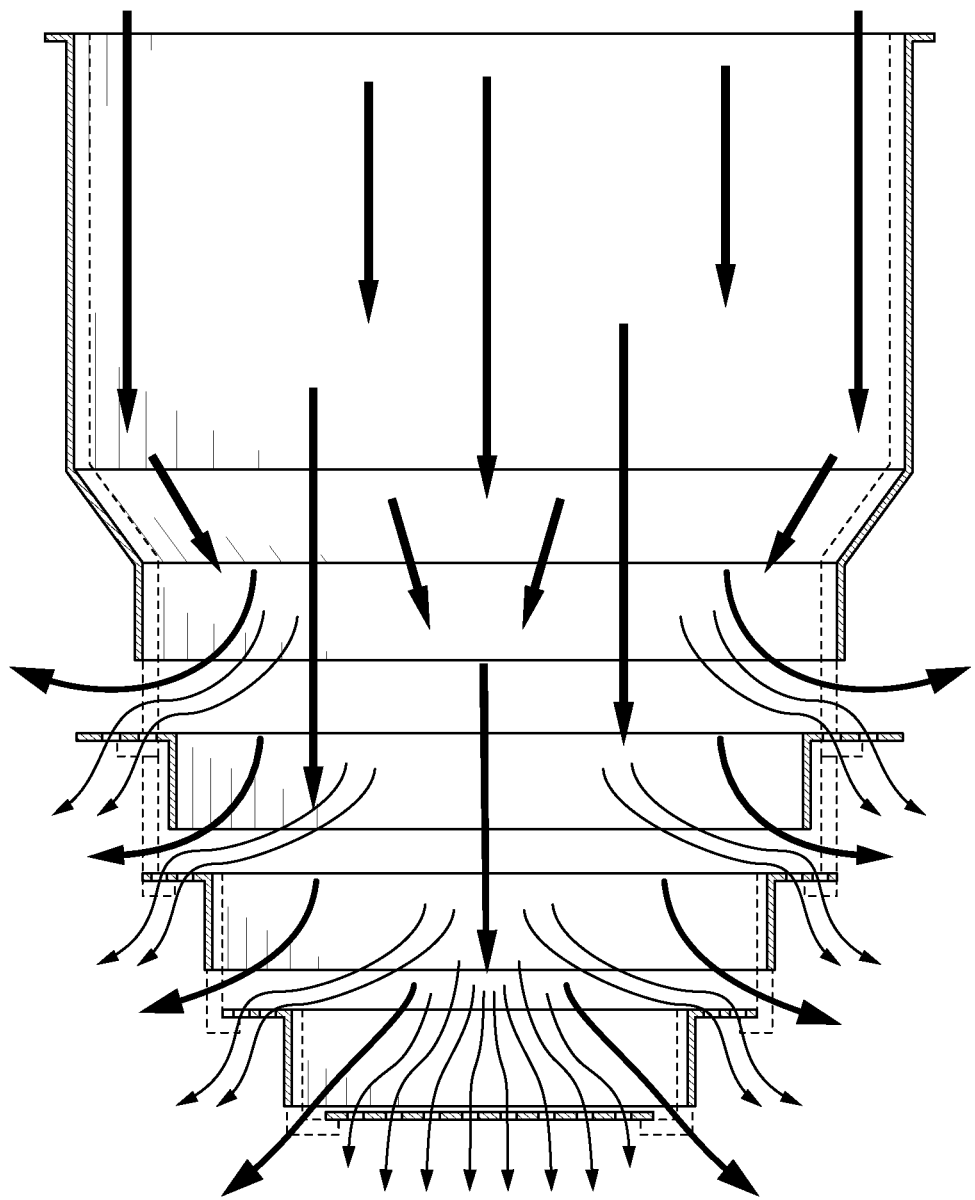
FIG. 6 is an elevation cross section of the second embodiment of the distributor showing the aerodynamics of the distributor.

In FIG. 5, another arrangement of the distributor 30 is shown using the same numbering as in FIGS. 1-4, but adding "100" so that the second embodiment of the distributor has the number 130. In this second arrangement, the generally cylindrical shell 131 has a more complex form with a first cylindrical section 131A connected to an inverted conical section 131B forming a reducing cross section for the distributor 130 and then continuing with a smaller, but generally cylindrical second cylindrical section 131C. In this arrangement, the first perforated deflector ring 140 has an outer diameter that is larger than the diameter of the second cylindrical section 130. As such, the first circumferential nozzle 142 is oriented to provide a much more radial orientation to the flow of reactants entering the reactor vessel 12 than the circumferential nozzle 42 and perhaps with some upward direction. Similarly, the second perforated deflector ring 150 has an outer diameter that is slightly larger than the diameter of the first neck 145. As such, the second circumferential nozzle 152 also provides a more radial orientation to the flow of the reactants than the second circumferential nozzle 52 in the first described embodiment although it should appear from the drawing that it will not impose as much of an upward flow as the first circumferential nozzle 142. The third circumferential nozzle 162 is constructed and oriented in a manner very comparable to the circumferential nozzles of the first described embodiment, however, the last circumferential nozzle 172 has a much more axially orientation to due to the deflector plate 170 being smaller than the third neck 165 and with the deflector plate being much closer in proximity to the bottom edge of the third neck. In this arrangement, each successive circumferential nozzle directs the flow of reactants radially outwardly and somewhat upwardly nearest the top of the reactor vessel 12 and in successively and progressively downward angles as shown in FIG. 6.

Figure 7:
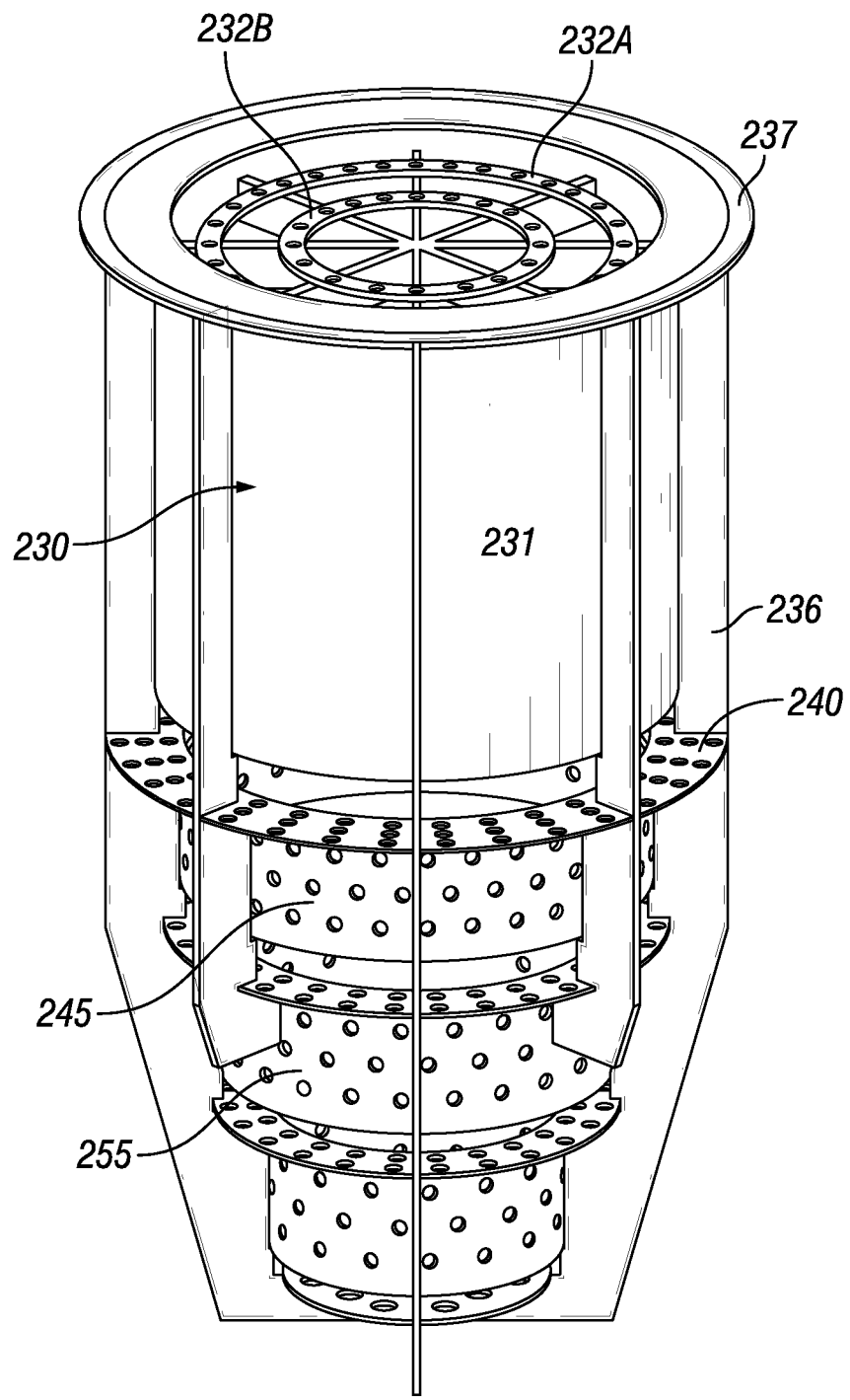
FIG. 7 is a perspective view of a third embodiment of the inventive distributor.
Figure 8:
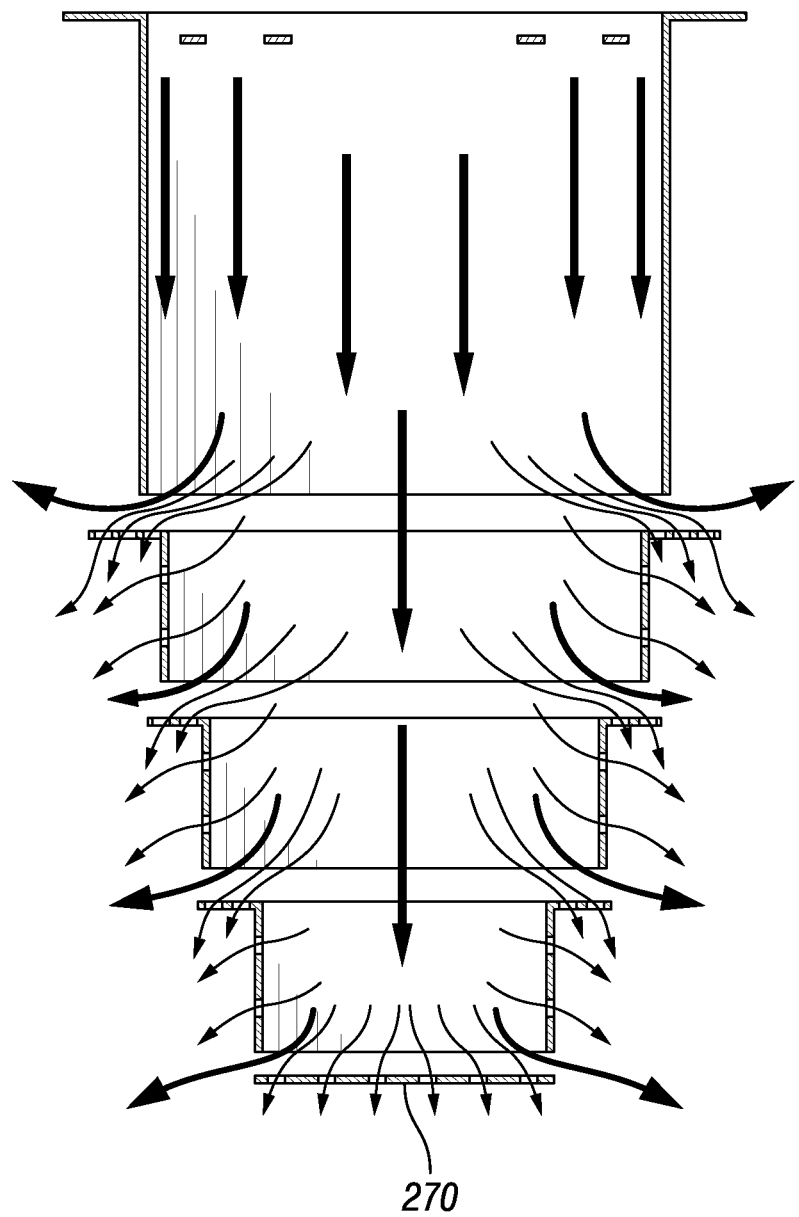
FIG. 8 is an elevation cross section of the third embodiment of the inventive distributor showing the aerodynamics of the distributor.

A third variation of the distributor is shown as 230 in FIGS. 7 and 8. This third embodiment includes two baffle rings 232A and 232B mounted generally concentrically and high in the distributor 230 near the level of the flange 237. These are somewhat smaller baffle rings than the baffle ring 32 in the first described embodiment and they are also perforated. However, these two baffle rings are designed to obstruct about the same percentage of the flow path through the generally cylindrical shell 231. Again, the baffle rings 232A and 232B create some turbulence and mixing and thereby create a more uniform flow across the width of the generally cylindrical shell as opposed to a flow characterized by a faster rate at the center and a slower rate along the walls. A second different aspect is that the support structure for the deflector rings is arranged on the outside of the generally cylindrical shell 231 and along the outside of the deflector rings and necks. The stanchions 236 and smaller than the flange 237 so as to allow the distributor 230 to be mounted to the reactor vessel 12 and extend down into the reactor vessel at the inlet end 14. The first perforated deflector ring 240 of this third embodiment, similar to the first deflector ring 140 in the second embodiment, has a larger diameter than the generally cylindrical shell 231 and thereby form a first circumferential nozzle 242 that provides some portion of upwards or backwards flow while primarily delivering the reactants in a very radial orientation into the reactor vessel 12. Focusing on FIG. 8, like the distributor 130 of the second embodiment, the successive circumferential nozzles to have a progressively more downward orientation. In this third embodiment, the through holes 271 in the deflector plate 270 are larger than the through holes through the deflector rings to allow more of the reactants to flow through the deflector plate. At the same time, the last or fourth circumferential nozzle 272 in the third embodiment is oriented more radial and less axial than the last or fourth circumferential nozzle 172 of the second embodiment. Another noteworthy difference is that the necks are slightly longer and are also perforated in this third embodiment. While the majority of the reactants are passing through the circumferential nozzles, flow is also emanating from the numerous through holes in the deflector rings, necks and deflector plate.

Figure 9:
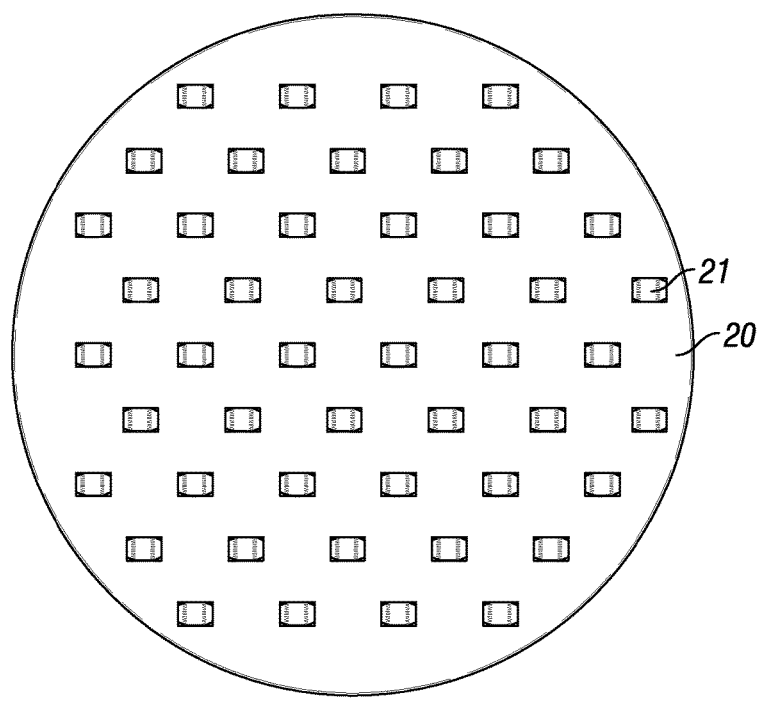
FIG. 9 is a top view of the reactor fixed valve tray.
Figure 10:
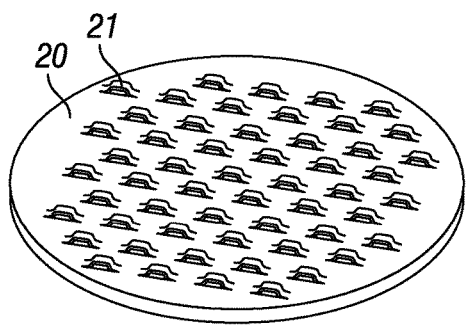
FIG. 10 is perspective view of the reactor fixed valve tray.

In conjunction with the distributor 30, one aspect of the present invention is to make sure that the flow of the reactants, and eventually the products, is distributed across reactor vessel 12 as evenly as practical by using a fixed valve tray 20 positioned under the catalyst bed, but on top of the inert material. The fixed valve tray 20 is constructed of a generally circular plate having the diameter to match the portion of the reactor vessel 12 at the level to which it is to be installed. The fixed valve tray 20 includes spaced apart openings. As seen in FIGS. 9 and 10, the openings are formed to allow flow of products but prevent passage of the catalyst. With an even spacing across the fixed valve tray 20, velocity differences across the width of the reactor vessel 12 would be suppressed by the size and spacing of the openings so as to restrict the localized rate at which the products may leave the catalyst bed 13. This provides another basis for forcing a more balanced rate of flow through the reactor vessel 12.

Figure 11:
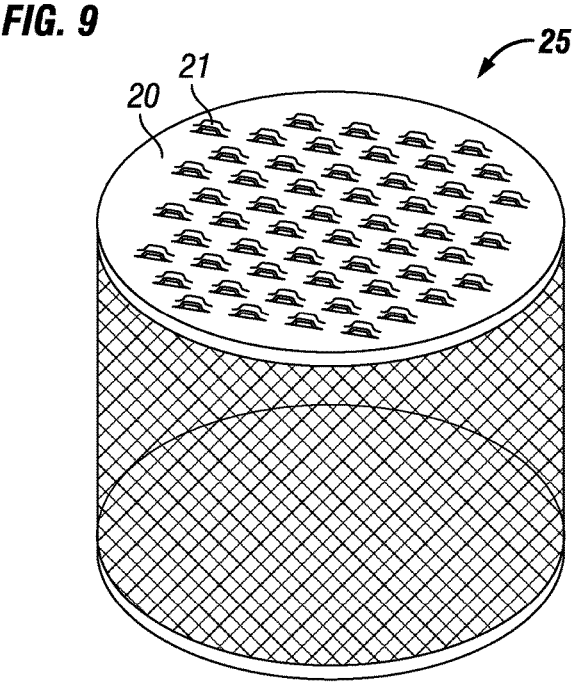
FIG. 11 is a perspective view of an alternative installation where the valve tray is installed on the top of the outlet device sometimes called an elephant stool.

As seen in FIG. 11, the flow may also be restricted at the middle of the vessel by using a plate similar to the valve tray installed at the top of the outlet of the reactor vessel 12 to prevent the flow from taking the most direct path down the middle of the reactor vessel 12. In this location, sometimes described as an elephant stool, an open mesh-like material surrounds the perimeter that is less restrictive of flow while the top surface is more restrictive of flow.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A reactor inlet distributor for delivering a feedstream of reactants into a reactor vessel comprising:
   a) a generally cylindrical body having an inlet end and an outlet end;
   b) a first deflector ring with an integrally attached first neck attached to but spaced from the outlet end of the generally cylindrical body by a set of stanchions such that a first circumferential nozzle is defined between the first deflector ring and the outlet end of the generally cylindrical body and the first neck extends from the first deflector ring away from the generally cylindrical body;
   c) two or more additional nozzles where a first additional nozzle is formed by at least one additional deflector ring with an integrally attached additional neck attached to but spaced from the first neck by at least a portion of the set of stanchions such that an additional circumferential nozzle is defined between the at least one additional deflector ring and the first neck; and
   d) the last of the two or more additional nozzles formed by a deflector plate attached to said at least one additional deflector ring by at least a portion of the set of stanchions, but spaced from a last additional neck, which in the arrangement of three nozzles would be said additional neck, but with more than three total nozzles, would be a neck between said additional neck and the deflector plate;
   wherein the generally cylindrical body has a portion nearest the first deflector ring and this portion has a diameter and wherein the reactor inlet distributor has an axis and wherein the first deflector ring has a larger diameter than the portion of the generally cylindrical body nearest the first deflector ring such that the first circumferential nozzle is oriented to direct reactants mostly radially outwardly away from the axis of the reactor inlet distributor, but also with a small directional component in a reverse axially direction such that reactants turn from the axial flow within the reactor inlet distributor to flowing in a direction slightly more than 90 degrees to the axial flow of the reactor inlet distributor, and further wherein each successive nozzle is arranged to impose a successively less reverse component of flow so that the direction of flow is progressively more axial through each successive circumferential nozzle and wherein the last of the two or more additional circumferential nozzles in the series of circumferential nozzles has the largest forward axial component of flow as compared to the first circumferential nozzle such that each successive circumferential nozzle has progressively less reverse axial flow and more forward axial flow ultimately having the last of the two or more additional nozzles creating a turn of less than 90 degrees to the axial flow of the reactor inlet such that at least two nozzles include a continuing forward component of flow while having a radially outward component of flow.

2. The reactor inlet distributor set forth in claim 1 wherein the deflector rings include through holes to allow reactants to pass through.

3. The reactor inlet distributor set forth in claim 1 wherein the deflector plate includes through holes to allow reactants to pass through.

4. The reactor inlet distributor set forth in claim 1 wherein the necks include through holes to allow reactants to pass through.

5. The reactor inlet distributor set forth in claim 1 wherein the first circumferential nozzle has a diameter and each successive circumferential nozzle has a smaller diameter than the one closer to the generally cylindrical body where the last circumferential nozzle has the smallest diameter.

6. The reactor inlet distributor set forth in claim 1 further including at least one baffle ring within the generally circumferential body to create more balanced flow across the interior of the generally circumferential body prior to the deflector rings.

* * * * *